United States Patent [19]

Gershun et al.

[11] Patent Number: 6,143,243
[45] Date of Patent: *Nov. 7, 2000

[54] METHOD OF INHIBITING CAVITATION-EROSION CORROSION OF ALUMINUM SURFACES USING CARBOXYLIC ACID BASED COMPOSITIONS COMPRISING POLYMERIZABLE-ACID GRAFT POLYMERS

[75] Inventors: Aleksei V. Gershun, Southbury; Peter M. Woyciesjes, Woodbury, both of Conn.

[73] Assignee: Prestone Products Corporation, Danbury, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/999,098

[22] Filed: Dec. 29, 1997

[51] Int. Cl.[7] ............................... C23F 11/12; C09K 5/20
[52] U.S. Cl. ................................. 422/13; 422/12; 422/17; 252/76; 252/79
[58] Field of Search .................................. 252/76, 79, 75; 422/7, 17, 13, 12

[56] References Cited

U.S. PATENT DOCUMENTS

| | | | |
|---|---|---|---|
| 4,146,488 | 3/1979 | Martin | 508/472 |
| 4,382,008 | 5/1983 | Boreland et al. | 252/75 |
| 4,392,972 | 7/1983 | Mohr et al. | 252/75 |
| 4,404,113 | 9/1983 | Peters et al. | 252/75 |
| 4,404,114 | 9/1983 | Mohr et al. | 252/75 |
| 4,448,702 | 5/1984 | Kaes | 252/70 |
| 4,528,334 | 7/1985 | Knopf et al. | 525/404 |
| 4,588,513 | 5/1986 | Triebel et al. | 252/75 |
| 4,647,392 | 3/1987 | Darden et al. | 252/75 |
| 4,873,011 | 10/1989 | Nam et al. | 252/75 |
| 4,946,616 | 8/1990 | Falla et al. | 252/75 |
| 5,073,283 | 12/1991 | Goddard et al. | 252/78.5 |
| 5,269,956 | 12/1993 | Miller et al. | 252/67 |
| 5,288,419 | 2/1994 | Turcotte et al. | 252/76 |
| 5,741,436 | 4/1998 | Gershun et al. | 252/76 |

FOREIGN PATENT DOCUMENTS

| | | |
|---|---|---|
| 564721 | 10/1993 | European Pat. Off. . |
| 769573 | 4/1997 | European Pat. Off. . |
| 1263398 | 3/1968 | Germany . |

OTHER PUBLICATIONS

Annual Book of ASTM Standards, Section 15, vol. 15.05, D1176, D1384, D1881, D2809 and D4340 (1996), No Month Available.

Beynon et. al., "Cooling System Corrosion in Relation to Design and Materials," Engine Coolout Testing: State of the Art, ASTM STP 705, W. H. Ailor, Ed., ASTM, Philadelphia, pp. 310–326 (1980), No Month Available.

Chen et. al., "Thermal Analysis of an Automotive Water Pump Seal," SAE Paper #920715, pp. 111–117, SAE Int'l Congress of Exposition, Detroit, MI Feb. 1992.

Chiba et. al., "FEM analysis of Mechanical Seals for Water Pumps of Automotive Engines," SAE Paper #920714, pp. 105–110, SAE Int'l Congress & Exposition, Detroit, MI Feb. 1992.

Chrysler Corporation Engineering Standards, "Engine Coolant–Glycol Type–Inhibited–Production and Service Use Part No. 4698542," Standard No. MS–9769 (1996), No Month Available.

Darden et al., "Monobasic/Diacid Combination as Corrosion Inhibitors in Antifreeze Formulations," *Worldwide Trends in Engine Coolants, Cooling System Materials and Testing*, SAE Int'l SP–811, Paper #900804, pp. 135–151 (1990), No Month Available.

Ford Engineering Material Specifications, "Coolant, Long Life Concentrate—For System Containing Cast and Wrought Aluminum," Specification No. ESE–M97B44–A (1995), No Month Available.

Ford Engineering Material Specifications, "Coolant, Concentrate, Extended Life, For Systems Containing Cast and Wrought Iron," Specification No. WSE–M97B44–B (1995), No Month Available.

Ford Engineering Material Specifications, "Coolant Organic Additive Technology, Concentrate, For Passenger Car and Light Truck," Specification No. WSS–M97B44–D (1995), No Month Available.

Ford Engineering Material Specifications, "Concentrate, For Medium Truck and Commercial Truck," Specification No. WSS–M97B44–D1 (1995), No Month Available.

General Motors Engineering Standards, "Long–Life Automotive Engine Coolant Antifreeze Concentrate–Ethylene Glycol," Specification No. GM6277M Aug. 1995.

Hercamp et. al., "Silicate Gelation in Heavy–Duty Diesel Engine Cooling Systems," SAE Paper #852327, pp. 1–16, SAE Truck & Bus Meeting and Exposition, Chicago, IL Dec. 1985.

Hirabayashi et. al., "Trouble and Countermeasure of Seals for Automotive Application—Part II," SAE Paper #800530, pp. 1–20, SAE Congress and Exposition, Cobo Hall, Detroit Feb. 1980.

(List continued on next page.)

*Primary Examiner*—Christine Skane
*Attorney, Agent, or Firm*—Fish & Neave

[57] ABSTRACT

This invention relates to a method of inhibiting the cavitation-erosion corrosion of aluminum surfaces. The method comprises the step of contacting the aluminum surface with a formulation comprising a corrosion inhibitor composition comprising one or more carboxylic acids, or salts or isomers thereof, and a polymerizable-acid graft polymer which comprises an unsaturated grafting acid and an alkylene oxide polymer, or copolymers thereof. This method has been demonstrated to be a surprisingly effective means to inhibit cavitation-erosion corrosion of aluminum surfaces found in the cooling systems of internal combustion engines.

27 Claims, No Drawings

OTHER PUBLICATIONS

Hudgens et. al., "Filtration of Coolants for Heavy Duty Engines," SAE Paper #881270, pp. 1–21, SAE Int'l Off–Highway & Powerplant Congress & Exposition, Milwaukee, WI Sep. 1988.

Hudgens et. al., "Test Methods for the Development of Supplemental Additives for Heavy–Duty Diesel Engine Coolants," Engine Coolant Testing: Second Volume, ASTM STP 887, R.E. Beal, Ed. ASTM, Philadelphia, pp. 189–215 (1986), No Month Available.

Keyser et. al., "An Empirical Approach to Seal Friction," *Corrosion 92*, The NACE Annual Conference and Corrosion Show, Paper No. 68, pp. 1–15 (1992), No Month Available.

Kinisky et. al., "Investigation of Premature Water Pump Seal Failures," *Worldwide Trends in Engine Coolants, Cooling System Materials and Testing*, SAE Int'l SP–811, Paper #900806, pp. 159–168 Feb. 1990.

Kiryu et. al., "The Effect of Coolant Additives and Seal Composition of Performance of Water Pump Seals of Automotive Engines," SAE Paper #890609, pp. 1–10 SAE Int'l Congress and Exposition, Detroit, MI Mar. 1989.

Kiryu et. al., "A Status of Sealing Performance of End–Face Type Seals for Water Pumps of Automotive Engines in Japan," SAE Paper #880303, pp. 87–93, SAE Int'l Congress and Exposition, Detroit, MI Mar. 1988.

Kiryu et. al., "An Investigation of Deposits Formation on Sealing Surfaces of Water Pump End Face Seals," *Lubrication Engineering*, vol. 45, 1, pp. 49–55 May 1988.

Less et. al., "Wear Testing of Silicon Carbide Mechanical Seals in Highly Conditioned Diesel Engine Coolants," ISATA, Nov. 1994.

A. Matsushima, "Guide to Automotive Water Pump Seals," SAE Paper #780404, pp. 1–8, SAE Congress and Exposition, Cobo Hall, Detroit Mar. 1978.

"1996–1997 Recommended Maintenance Practices Manual," The Maintenance Council, American Trucking Association, Inc. (1996), No Month Available.

Nalco, "Cooling System Corrosion," Technifax TX–159 (1988), No Month Available.

B. D. Oakes, "Observation on Aluminum Water Pump Cavitation Tests," Second Symposium on Engine Coolants, ASTM STP 887, pp. 231–248 (1986), No Month Available.

Ohkawa et. al., "A New Antifreeze Coolant for Heavy–Duty Diesel Engines," SAE Paper #900433, pp. 1–12, SAE Int'l Congress and Exposition, Detroit, MI Mar. 1990.

Scott et. al., "Coolant Pump Failure Rates as a Function of Coolant Type and Formulation," SAE Paper #940768, pp. 1–5, SAE Int'l Congress & Exposition, Detroit, MI Mar. 1994.

Stafford et. al., "Testing Procedures for Introduction of Silicon Carbide and Carbon Water Pump Seal Faces into Heavy Duty Diesel Service," *Engine Coolants, Cooling System Materials, and Components*, SAE Paper #930585, pp. 99–103 SAE Int'l Congress and Exposition, Detroit, MI Mar. 1993.

D. E. Turcotte, "Engine Coolant Technology, Performance and Life for Light Duty Application," Fourth Symposium on Engine Coolants Nov. 1997.

"Vital Signs," *Ward's Auto World*, p. 22 (Sep. 1996).

Winter et al. "The Story Behind the Numbers," *Ward's 1996 Automotive Yearbook*, pp. 24–30 (58th ed. 1996), No Month Available.

METHOD OF INHIBITING CAVITATION-EROSION CORROSION OF ALUMINUM SURFACES USING CARBOXYLIC ACID BASED COMPOSITIONS COMPRISING POLYMERIZABLE-ACID GRAFT POLYMERS

FIELD OF THE INVENTION

The present invention relates generally to a method of inhibiting cavitation-erosion corrosion of aluminum surfaces. More particularly, the present invention relates to the use of carboxylic acid based compositions comprising polymerizable-acid graft polymers in antifreeze coolant formulations as cavitation-erosion corrosion inhibitors to provide prolonged protection to the aluminum surfaces in cooling and/or heating systems, such as the aluminum components of water pumps used in internal combustion engines.

BACKGROUND OF THE INVENTION

Corrosion has long been a problem when certain metals or alloys are used in applications in which they come into contact with an aqueous medium. For example, in heat-transfer systems, such as those found in internal combustion engines, alcohol-based heat transfer fluids (i.e., antifreezes can be very corrosive to the metal surfaces of the heat-transfer systems. Compounding this problem is that the corrosion is accelerated under normal engine operating conditions (i.e., high temperatures and pressures).

Aluminum surfaces, are particularly susceptible to corrosion. See Darden et al., "Monobasic/Diacid Combination as Corrosion Inhibitors in Antifreeze Formulations," *Worldwide Trends in Engine Coolants, Cooling System Materials and Testing*, SAE Int'l SP-811, Paper #900804, pp. 135–51 (1990)("SAE SP-811").

Indeed, aluminum surfaces are susceptible to several types of corrosion including general corrosion, pitting and crevice corrosion as well as cavitation-erosion corrosion. These types of corrosion, however, typically occur under different conditions and thus, affect different types of aluminum surfaces. For example, general corrosion usually occurs on aluminum surfaces which are readily susceptible to corrosion because they are poorly inhibited or because they are, subject to "heat-rejecting" conditions (e.g., cylinder heads and engine blocks) or "heat-accepting" conditions (e.g., radiators and heater cores).

Pitting/crevice corrosion usually occurs on the thin aluminum sheets used in radiators or heater cores. Such corrosion generally results from localized penetration of the oxide film which would otherwise cover and protect the aluminum surfaces. See SAE SP-811.

Cavitation-erosion corrosion ("CE-type" corrosion), like pitting/crevice corrosion, attacks the protective oxide film but results from explosion of bubbles on the aluminum surfaces. See SAE SP-811 at 136 CE-type corrosion can be accelerated by the formation of foam in the cooling system. Foam results from air bubbles which are entrapped and agitated in the cooling system. See, e.g., Nalco, "Cooling System Liner/Water Pump Pitting," Technifax TF-159 (1988). Thus, water pumps, which are used to circulate antifreeze coolants throughout a vehicle's cooling and/or heating systems, are particularly susceptible to CE type corrosion. This is because bubbles are readily formed on the trailing sides of the water pump impeller blades due to locally reduced pressure and consequent boiling caused by the high rotation rate. When these bubbles collapse in higher pressure areas in the water pump, they can erode the metal in these areas. This process can eventually destroy the impeller causing loss of pumping performance and/or can perforate the pump body leading to loss of engine coolant. See, e.g., B. D. Oakes, "Observation on Aluminum Water Pump Cavitation Tests," Second Symposium on Engine Coolants, ASTM STP 887, pp. 231–48 (1986).

The corrosion of aluminum surfaces has become a significant concern in the automotive industry because of the increasing use of such lightweight materials. See, e.g., *Ward's Auto World*, p. 22 September, 1996); *Ward's* 1996 *Automotive Yearbook*, p. 27 (58th ed. 1996). For example, heat exchangers in cars and light duty trucks are now being constructed using aluminum components including the water pumps. See Hudgens et al., "Test Methods for the Development of Supplemental Additives for Heavy-Duty Diesel Engine Coolants," Engine Coolant Testing: Second Volume, ASTM STP 887, R. E. Beal, Ed., ASTM, Philadelphia, 1986, pp. 189–215; Oakes, B. D., "Observations on Aluminum Water Pump Cavitation Tests," Engine Coolant Testing: Second Volume, ASTM STP 887, R. E. Beal, Ed., ASTM, Philadelphia, 1986, pp. 231–248; Beynon et al., "Cooling System Corrosion in Relation to Design and Materials," Engine Coolant Testing: State of the Art, ASTM STP 705, W. H. Ailor, Ed., ASTM, Philadelphia, 1980, pp. 310–326. In particular, CE-type corrosion has become a significant concern because, aside from mechanical seal failures caused by high thermal stresses and inadequate lubrication, CE-type corrosion is one of the leading causes of water pump failures. See, e.g., E. Beynon, supra at 310–326 (1980).

In general, corrosion inhibitors have been used to protect the metal surfaces used in heat transfer systems. For example, triazoles, thiazoles, borates, silicates, phosphates, benzoates, nitrates, nitrites and molybdates have been used in antifreeze formulations. See, e.g., U.S. Pat. No. 4,873,011; see also, SAE SP-811 at pp. 135–138, 145–46. However, such corrosion inhibitors have several problems, including expense, and inadequate long-term protection. See U.S. Pat. No. 4,946,616, col. 1, lines 31–45; U.S. Pat. No. 4,588,513, col. 1, lines 55–64; SAE SP-811, pp. 137–38. Accordingly, automobile manufacturers have begun using, and several now require, organic acid based (or extended life) corrosion inhibitors such as mono- and/or di-carboxylic acids. A number of carboxylic acid corrosion inhibitors have been described. See, e.g., U.S. Pat. Nos. 4,382,008, 4,448, 702 and 4,946,616; see also, U.S. Pat. application Ser. No. 08/567,639, incorporated herein by reference.

However, carboxylic acid corrosion inhibitors, while effective at protecting against general and pitting/crevice types of aluminum corrosion, are generally ineffective as CE-type corrosion inhibitors. See, e.g. D. E. Turcotte, "Engine Coolant Technology, Performance and Life for Light Duty Application," Fourth Symposium on Engine Coolants (1997). Indeed, many of the known aluminum corrosion inhibitors, while effective at protecting against one or more types of aluminum corrosion, are generally not known to be effective at inhibiting all types of aluminum corrosion. For example, silicates and phosphate salts known to be effective at inhibiting general corrosion and CE-type corrosion, are not known to inhibit polymerizable/crevice corrosion. Also, nitrates which are known to be effective pitting/crevice or CE-type corrosion inhibitors, are not known to inhibit general or CE-type corrosion. Similarly, polymeriable-acid graft copolymers have been used in traditional antifreeze formulations (i.e., containing silicates, phosphates and/or borates) as general corrosion inhibitors for the protection of heat-rejecting aluminum surfaces. See U.S. Pat. Nos. 4,392,972 and 4,904,114. However, such grafted copolymers are not known to be effective as pitting/crevice or CE-type corrosion inhibitors.

Other polymeric compound have been suggested as CE-type corrosion inhibitors for aluminum and aluminum alloys. For example, U.S. Pat. No. 5,288,419 discloses the use of a certain class of polymeric polycarboxylates as CE-type corrosion inhibitors. However, it has been shown that such polymeric polycarboxylates do not consistently pass ASTM standards for CE-type corrosion inhibitors.

Moreover, while other CE-type corrosion inhibitors are known, many of these corrosion inhibitors are metal-specific for non-aluminum surfaces, or are undesirable or unacceptable for the organic acid based antifreeze formulations used today. For example, silicates and phosphate salts, known CE-type corrosion inhibitors of aluminum surfaces, are unacceptable because they have been prohibited for use in organic acid formulations by a number of original equipment automotive manufacturers. See, e.g., General Motors Engineering Standards, "Long-Life Automotive Engine Coolant Antifreeze Concentrate-Ethylene Glycol," Specification No. GM 6277M; Ford Engineering Material Specifications, "Coolant, Organic Additive Technology, Concentrate," Specification No. WSS-M97B44-C; Chrysler Corporation Engineering Standards, "Engine Coolant-Glycol Type-Inhibited-Production and Service Use," Standard No. MS-9769. See also, U.S. Pat. No. 4,146,488 (discloses the use of blends of monoethanolamine borate and graft copolymer salts as effective in providing cast iron corrosion protection).

Thus, there remains a need for an effective and reliable method of inhibiting CE-type corrosion of aluminum surface which is compatible with the use of carboxylic acid based antifreeze formulations.

SUMMARY OF THE INVENTION

The present invention provides a method of inhibiting CE-type corrosion of aluminum surfaces. The inventive method comprises the step of contacting the aluminum surface with a corrosion inhibitor composition comprising a carboxylic acid, or salt, isomer or mixture thereof, and a polymerizable-acid graft polymer.

The carboxylic acid used in the corrosion inhibitor composition may be selected from the group consisting of saturated and unsaturated aliphatic, and aromatic, mono-, di- and tri-carboxylic acids, and inorganic and organic salts and isomers thereof, and any combination thereof. The polymelizable-acid graft polymer comprises up to 60% (by weight) of an unsaturated grafting acid and a base polymer comprising an alkylene oxide polymer or mixtures thereof (i.e., forming copolymers), having the following formula:

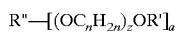

wherein
each R' is independently selected from the group consisting of a hydrogen atom, hydrogen radicals and acyl radicals free of aliphatic unsaturation;
R" is selected from the group consisting of a hydrogen atom, hydrogen radicals, amine-containing radicals and acyl radicals;
each "n" has, independently, a value of from 2 to 4;
each "z" has, independently, a value of from 4 to about 3500;
"a" has a value of from 1 to 4.

Generally, the alkylene oxide polymers useful in this invention have a number average molecular weight of from about 150 to about 380,000, and more preferably from about 400 to about 10,000.

The method of this invention has been demonstrated to be a surprisingly effective means to inhibit CE-type corrosion of aluminum surfaces, especially those found in the cooling and/or heating systems of internal combustion engines such as the water pumps used to circulate coolant throughout the engine. For this application, the method involves contacting the aluminum surface with an antifreeze formulation comprising a liquid alcohol which functions as a freezing point depressant, from about 0.1% to about 5.5% by weight of the corrosion inhibitor composition, and from about 10% to about 90% by weight water.

DETAILED DESCRIPTION OF THE INVENTION

In order that the invention herein described may be more fully understood, the following detailed description is set forth.

The present invention provides an effective and reliable method for inhibiting CE-type corrosion of aluminum surfaces. The inventive method comprises the step of contacting the aluminum surface with a corrosion inhibitor composition comprising (a) one or more carboxylic acids, or salts or isomers thereof; and (b) one or more polymerizable-acid graft polymers.

The carboxylic acid used in the corrosion inhibitor composition may be selected from the group consisting of saturated and unsaturated aliphatic and aromatic mono-, di- and tri-carboxylic acids, and inorganic and organic salts (e.g., alkali and alkaline earth metal, ammonium and amine salts) and isomers thereof and any combination thereof. Preferred carboxylic acids include $C_4$–$C_{12}$ mono- or di-carboxylic acids such as 2-ethyl hexanoic acid, neooctanoic acid, neodecanoic acid and sebacic acid, or salts (e.g., alkali and alkaline earth metal, ammonium or amine salts), isomers or mixtures thereof. More preferred carboxyic acids include mixtures having a major amount of a $C_8$ monocarboxylic acid component (e.g., neo-octanoic acid and/or 2-ethyl hexanoic acid, more preferably 2-ethyl hexanoic acid) and neodecanoic acid, or salts (e.g., alkali and alkaline earth metal, ammonium or amine salts) or isomers thereof. Where the mixture of a $C_8$ mono-carboxylic acid component and neodecanoic acid is used, the preferred mixture comprises the $C_8$ mono-carboxylic acid component and neodecanoic acid in the weight ratio of about 3:1. See U.S. Pat. application Ser. No. 08/567,639, incorporated herein by reference.

The polymerizable-acid graft component of the corrosion inhibitor composition comprises an unsaturated grafting acid and an alkylene oxide polymer having the following formula:

wherein:
each R' is independently selected from the group consisting of a hydrogen atom, hydrogen radicals, and acyl radicals free of aliphatic unsaturation;
R" is selected from the group consisting of a hydrogen atom, hydrogen radicals, amine-containing radicals and acyl radicals;
each "n" has, independently, a value of from 2 to 4;
each "z" has, independently, a value of from 4 to about 3500 and preferably is from about 8 to about 800;
"a" has a value of from 1 to 4.

Generally, the alkylene oxide the polymers useful in this invention have a number average molecular weight of from about 150 to about 380,000, and more preferably from 400 to about 10,000.

The preferred class of alkylene oxide polymers have the formula:

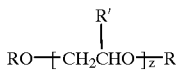

wherein

R is selected from the group consisting of a hydrogen atom, hydrogen radicals, amine-containing radials and acyl radicals;

each R' is independently selected from the group consisting of —H,—CH$_3$ and —C$_2$H$_5$, resulting, respectively, in an ethylene oxide ("EO"), propylene oxide ("PO") or butylene oxide ("BO") polymer; and "z" has a value of from 4 to about 3500 and preferably is from about 8 to about 800.

More preferred alkylene oxide polymers include copolymers of EO and PO polymers where the weight ratio of EO:PO can be from about 1:100 to about 100:1, preferably from about 1:20 to about 20:1, and more preferably from about 1:3 to about 3:1. Such alkylene oxide polymers are readily available (e.g., Union Carbide's UCON®, Dow's, BASF's and Olin's polyalkylene glycols) or readily made (see, e.g., U.S. Pat. Nos. 4,146,488; 4,392,972 and 4,404,114).

The grafting acid may be any unsaturated, polymerizable-acid and selected from the group consisting of acrylic, methacrylic, crotonic, maleic, vinylsulfonic and vinyl phosphoric acids. The term "polymerizable-acid" refers to hydrolyzable precursors such as acrylonitrile, ethyl acrylate, methylmethacrylate, ethyl maleate, bis-(2-chloroethyl) vinylphosphonate, bis-(2-chloroethyl)vinylsulfonate or mixtures thereof and the like. Preferred grafting acids include acrylic, methacrylic, crotonic and maleic acids, more preferably acrylic and maleic acids, and most preferably acrylic acid.

The grafting of the polymerizable-acid onto the alkylene oxide polymer can be carried out by free radical polymerization as is known in the art (see, e.g., U.S. Pat. Nos. 4,146,488, 4,392,972, 4,404,114 and 4,528,334) such that the amount of grafting acid in the grafted polymer is up about 60% (by weight). Preferably the grafting acid content is from about 1.0% to, about 30%, more preferably from about 1% to about 20%, and even more preferably from about 3% to about 15%. While even very small amounts of grafting acid are expected to provide CE-type corrosion inhibition to the corrosion inhibitor composition used in this invention, the use of a grafted polymer having more than about 60% grafting acid content may result in a polymer having an unduly high viscosity.

The polymerizable-acid grafted polymers useful in the present invention are preferably partially or wholly neutralized with a base to result in the salt form of the grafted polymer. It is preferred that the acid graft polymers be wholly neutralized. The base used to partially or wholly neutralize the grafted polymer may be any commercially available base including ammonium hydroxide, alkali metal or alkaline earth metal hydroxides, and amines including amines having the formula:

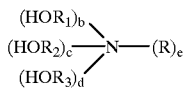

wherein each R is, independently, H or an alkyl group having 1 to 6 carbon atoms;

each of R$_1$, R$_2$ and R$_3$ is independently selected from the group consisting of alkylene radicals having 2 to 4 carbon atoms;

"e" has a value of from 0 to 3 each of "b," "c" and "d" is independently 0 or 1, with the proviso that when "b," "c" and "d" are 1, then "e" is 0.

When alkali metal or alkaline earth metal hydroxides are used, sodium or potassium hydroxide, or mixtures thereof are preferred.

The present method may be used in a number of CE-type corrosion-inhibiting applications, including, but not limited to, antifreeze coolant concentrates and formulations (diluted concentrates) used in the cooling systems of internal combustion engines and in industrial and commercial heating and/or cooling systems. One preferred application of this method is to inhibit CE-type corrosion of the aluminum components of the cooling systems of internal combustion engines such as the water pumps of those systems.

When used in antifreeze concentrates, such concentrates typically comprise (a) a liquid alcohol which functions as a freezing point depressant and (b) a corrosion inhibitor composition comprising a carboxylic acid, or salt, isomer or mixture thereof and a polymerizable-acid graft polymer. To form an antifreeze formulation, the concentrate is diluted with water such that, e.g., the formulation comprises from about 10% to about 90% by weight water, and more preferably from about 25% to about 75% by weight water.

Suitable liquid alcohols which function as freezing point depressants include any alcohol or other heat transfer medium and preferably is at least one alcohol, selected from the group consisting of methanol, ethanol, propanol, ethylene glycol, diethylene glycol, triethylene glycol, propylene glycol, dipropylene glycol, butylene glycol, glycerol, the monoethylether of glycerol, the dimethylether of glycerol, alkoxy alkanols (such as methoxyethanol) and mixtures thereof. The preferred alcohol is selected from the group consisting of ethylene glycol, diethylene glycol, propylene glycol, dipropylene glycol and mixtures thereof.

The corrosion inhibitor con position is typically added in an amount sufficient such that from about 0.1% to about 5.5% (by weight) of the corrosion inhibitor composition is present in the antifreeze coolant concentrate. The carboxylic acid and polymerizable-acid graft polymer used in the corrosion inhibitor composition are described above. More preferably, the carboxylic acid comprises a mixture of a major amount of a C$_8$ mono-carboxylic acid component (e.g., neo-octanoic acid and/or 2-ethyl hexanoic acid, more preferably 2-ethyl hexanoic acid) and neo-decanoic acid. Where the mixture of a C$_8$ mono-carboxylic acid component and neo-decanoic acid is used, the preferred mixture comprises the C$_8$ mono-carboxylic acid component and neo-decanoic acid in the weight ratio of about 3:1 (e.g., from about 2.4% to about 3.3% (by weight of the antifreeze coolant concentrate) of the C$_8$ mono-carboxylic acid component, more preferably about 3.1%, and from about 0.8% to about 1.1% (by weight of the antifreeze coolant concentrate) of neo-decanoic acid, more preferably about 1.0%). See U.S. Pat. application Ser. No. 08/567,639.

The amount of the grafted polymer present may be from about 0.01 to about 20% (by weight of the antifreeze coolant concentrate) and more preferably from about 0.1% to about 10%.

One preferred antifreeze coolant formulation useful in the present invention comprises:

(a) from about 80% to about 99% by weight of a liquid alcohol which functions as a freezing point depressant;

(b) from about 2.0% to about 5.0% by weight of a mixture of 2-ethylhexanoic acid, or salts or isomers thereof, and neo-decanoic acid, or salts or isomers thereof, (c) from about 0.01% to about 20 (by weight) of a polymerizable-acid graft polymer comprising (i) acrylic acid and (ii) an alkylene oxide copolymer comprising a EO and PO polymers; and (d) from about 10% to about 90% by weight water.

The grafted copolymers herein described have previously been identified as lubricants as well as general corrosion inhibitors used in traditional antifreeze formulations (i.e., containing silicates, phosphates and/or borates) to protect heat-rejecting aluminum surfaces. See, e.g., U.S. Pat. Nos. 4,146,488; 4,392,972 and 4,404,114. However, such grafted copolymers have not previously been recognized as, or suggested to be, CE-type corrosion inhibitors for aluminum surfaces.

The corrosion inhibitor con position may also include from about 0.01% to about 0.4% (by weight of the antifreeze coolant concentrate) of one or more alkali, alkaline earth metal, ammonium or amine salts of nitrite. Additionally, the corrosion inhibitor composition may also include one or more inorganic and/or organic corrosion inhibitors, such as di-carboxylic acids, triazoles, thiazoles, phosphates, borates, silicates, molybdates, nitrates or the alkali metal, alkaline earth metal, ammonium or amine salts thereof. Such additional corrosion inhibitors may be added in concentrations of up to about 5.5% (by weight of the total antifreeze formulation). The preferred corrosion inhibitor composition used in this invention further comprises a triazole or thiazole, more preferably, an aromatic triazole or thiazole such as benzotriazole ("BZT"), mercaptobenzothiazole ("MBT") or tolyltriazole ("TTZ") and most preferably, TTZ.

The antifreeze formulation i nay also comprise a sufficient amount of an alkali metal hydroxide to adjust the pH to between about 6.0 to about 9.5, preferably to about 6.5 to about 9.0. Other additives may also be used depending on the application. Suitable additives include dyes (e.g., "Alizarine Green," "Uranine Yellow" or "Green AGS-liquid" from Abbey Color Inc., "Orange II (Acid Orange 7)" or "Intracid Rhodamine WT (Acid Red 388)" from Crompton & Knowles Corp.), odor masking aids, perfumes, antifoams, rust inhibitors, pH buffers, scale inhibitors, and/or sequestration and dispersion agents (e.g.,"Dequest" from Monsanto Chemical Company, "Bayhibit" from Miles Inc., "Nalco" or "NalPREP" from Nalco Chemical Company). Also, although the grafted copolymers described herein have been shown to be useful as lubricants (see, e.g., U.S. Pat. No. 4,146,488), and thus capable of reducing water pump seal failures caused by high thermal stresses on the seal interfaces (resulting from excessive frictional heating), additional lubricants may also be added as necessary (e.g., preferably fluorinated polymers such as TEFLON®, KRYTOX®, VYDAX® from Du Pont).

In order that this invention may be better understood, the following examples are set forth. These examples are for the purpose of illustration only and are not to be construed as limiting the scope of the invention in any way.

EXAMPLES

To evaluate the effectiveness of the polymerizable-acid graft polymers as CE-type corrosion inhibitors, a number of formulations were subjected to standard analytical tests. In each of these formulations, one of five stock antifreeze coolants were used (Concentrates A–D and Formulation). Concentrates A–D (Tables 1A–1D) are commercially available and/or industry standard antifreeze coolant concentrates ("GM-6043M" (A), Texaco's "Extended Long Life Coolant DEXCOOL®" (B), Prestone's "Extended Life 5/100 Antifreeze" (C), and "GM-6038M" (D)). Formulation E is a used coolant formulation comprising a 50/50 (by volume) blend of deionized water and Concentrate A that was subjected to a flee test of 100,000 miles. As a result of the fleet test, Formulation E also comprises certain degradation and corrosion products (e.g., glycolate, acetate, formate).

TABLE 1A

Stock Antifreeze Coolant Concentrate "A"

| Components | wt % |
| --- | --- |
| Ethylene glycol | 95.53 |
| Sodium nitrate (NaNO$_3$) | 0.10 |
| Sodium molybdate (Na$_2$MoO$_4$.2H$_2$O) | 0.20 |
| Sodium tetraborate (Na$_2$B$_4$O$_7$.5H2O) | 0.40 |
| Sodium silicate (liquid Na$_2$SiO$_3$) (SiO$_2$/Na$_2$O weight-ratio of 3.22) | 0.30 |
| Phosphoric acid (83% H$_3$PO$_4$) | 0.15 |
| Sodium mercaptobenzothiazole (50% soln.) | 0.50 |
| Sodium tolyltriazole (50% soln.) | 0.20 |
| Sodium hydroxide | 0.235 |
| Miscellaneous (water, stabilizers, dyes, etc.) | 2.385 |
| pH | 10.5 |

TABLE 1B

Stock Antifreeze Coolant Concentrate "B"

| Components | wt % |
| --- | --- |
| Ethylene glycol, diethylene glycol and m-butylether-di(ethylene glycol) | >91.8 |
| Sebacic acid | 0.23 |
| 2-ethyl hexanoic acid | 2.74 |
| Potassium tolyltriazole (0.25 wt % soln.) | 2195 (mg/ml) |
| pH | 8.9 |

TABLE 1C

Stock Antifreeze Coolant Concentrate "C"

| Components | wt % |
| --- | --- |
| Ethylene and diethylene glycol | >80 |
| Disodium sebacate | 1–5 |
| Miscellaneous (NaTTZ, NaNO3) | >1 |
| pH | 9.0 |

TABLE 1D

Stock Antifreeze Coolant Concentrate "D"

| Components | wt % |
| --- | --- |
| Ethylene glycol | 95.76–95.77 |
| Sodium nitrate (NaNO$_3$) | 0.20 |

TABLE 1D-continued

Stock Antifreeze Coolant Concentrate "D"

| Components | wt % |
|---|---|
| Sodium tetraborate ($Na_2B_4O_7.5H_2O$) | 1.00 |
| Sodium metasilicate ($Na_2SiO_3.5H_2O$) | 0.15 |
| Sodium orthophosphate ($Na_3PO_4.12H_2O$) | 0.45 |
| Sodium tolyltriazole (50% soln.) | 0.20 |
| Sodium hydroxide | 0.20 |
| Miscellaneous (water, stabilizers, dyes, etc.) | 2.032–2.042 |
| pH | 10.5 |

To these stock coolants were added a variety of non-grafted and grafted polymer "additives" shown in Tables 2 and 3 with and without a pH adjustment (i.e., NaOH). For each of these additives, the base polymer used was either propylene oxide ("PO") or a copolymer of ethylene oxide and propylene oxide ("EO/PO").

TABLE 2

Non-Grafted Polymer Additives

| | Additive | | |
|---|---|---|---|
| Characteristics | 1 | 2 | 3 |
| Base polymer | PO | EO/PO, 50/50 (v/v) | PO |
| Number average molecular weight | 910 | 5100 | 425 |
| Starter alcohol | None | butanol | None |
| Polymerizable-acid graft polymer (% graft) | 0 | 0 | 0 |
| Grafted acid | None | None | None |
| pH adjusted with NaOH | None | None | None |

TABLE 3

Grafted Polymer Additives

| | Additive | |
|---|---|---|
| Characteristics | 4 | 5 |
| Base polymer | EO/PO, 50/50 (v/v) | EO/PO, 50/50 (v/v) |
| Number average molecular weight | 5100 | 5100 |
| Starter alcohol | butanol | None |
| Polymerizable-acid graft polymer (% graft) | 15 | 15 |
| Grafted acid | Acrylic | Acrylic |
| pH Adjusted with NaOH to pH = 7 | No | Yes |

As discussed below in more detail, the resulting solutions were then subjected to any of four tests.

1. ASTM D2809—"Standard Test Method for Cavitation Corrosion and Erosion-Corrosion Characteristics of Aluminum Pumps with Engine Coolants"

Fourteen different antifreeze, formulations were prepared and evaluated under the conditions set forth by ASTM D 2809. See Annual Book of ASTM Standards, Section 15, Volume 15.05, (1996), incorporated herein by reference. ASTM D2809 is the standard test method for CE-type corrosion of aluminum pumps using antifreeze coolants. As set forth in Table 4, except for Examples 1, 5 and 9 which serve as control formulations, each of the Examples tested comprised a stock antifreeze coolant (Concentrates B or D shown in Tables 1B–1D, respectively), and 0.5% (by weight) of a polymer additive. Before testing, each of the test solutions was diluted in accordance with ASTM D2809. These formulations were prepared in accordance with note #4 set forth in ASTM D2809.

After preparing the formulations and subjecting them to the test procedures set forth in ASTM D2809 (100 hours of pump operation at a nominal pump speed of 4600 rpm, 113° C. and 103 kPa), the aluminum pump, casting/cover and impeller were visually inspected and rated on a scale of 1 to 10 (according to the recommendations set forth in ASTM D2809. A rating of 8 (for each of the pump, casting/cover and impeller) is the minimum required to pass ASTM D2809 with 10 being perfect.

TABLE 4

Cavitation-Erosion Corrosion (ASTM D2809)

| Example | Stock Coolant Used | Additive Used | Pump Rating | Casting Rating | Impeller Rating |
|---|---|---|---|---|---|
| 1 | B | None | 4 | 5 | 1 |
| 2 | B | 1 | 8 | 7 | 5 |
| 3 | B | 4 | 10 | 10 | 9 |
| 4 | B | 5 | 10 | 10 | 10 |
| 5 | C | None | 6 | 5 | 5 |
| 6 | C | 1 | 7 | 7 | 7 |
| 7 | C | 4 | 8 | 8 | 7 |
| 8 | C | 5 | 10 | 10 | 10 |
| 9 | D | None | 1 | 2 | 1 |
| 10 | D | 1 | 5 | 8 | 5 |
| 11 | D | 2 | 8 | 8 | 6 |
| 12 | D | 3 | 7 | 8 | 7 |
| 13 | D | 4 | 8 | 10 | 8 |
| 14 | D | 5 | 9 | 9 | 9 |

As shown in Table 4, the control formulations (Examples 1, 5 and 9) all failed ASTM D2809. The formulations with non-grafted polymer additives (Examples 2, 6, 10–12) also failed ASTM D2809. However, the use of a grafted polymer improved performance in all formulations and with one exception (Example 7, and even that formulation demonstrated improved performance compared to Examples 5–6), resulted in an antifreeze formulation that consistently passed ASTM D2809 (Examples 3–4, 8, 13–14). Moreover, the use of a grafted polymer that had been neutralized with a base (Examples 4, 8 and 14) demonstrated the highest overall rating of the formulations tested, and indeed for two of the three stock coolants achieved a perfect score.

2. ASTM D1881—"Standard rest Method for Foaming Tendencies of Engine Coolants in Glassware"

Six different antifreeze formulations were prepared and evaluated under the conditions set forth by ASTM D1881. See Annual Book of ASTM Standards, Section 15, Volume 15.05 (1996), incorporated herein by reference. ASTM D1881 is a standard test method used to evaluate the foaming tendencies of antifreeze coolants under laboratory controlled aeration conditions. As previously discussed, the foaming of an antifreeze formulation in a vehicle's cooling and/or heating system accelerates CE-type corrosion.

As set forth in Table 5, all of the Examples tested comprised Concentrate A. Examples 15–18 include 0.5% (by weight) of different commercially available water pump treatment additives. Example 19 comprised 0.5% (by weight) of a non-grafted polymer while Example 20 comprised 0.5% (by weight) of a neutralized grafted polymer. Before testing, each of the solutions was (diluted in accordance with ASTM D1881. The additive concentration should be diluted with deionized water to the recommended use concentration (at freezing point of ±17.8° C.±1° C. or 0° F. ±2° F.) These formulations were prepared in accordance with the "Treatment of Mixtures" prescribed by ASTM D1176.

After preparing the test formulations and subjecting them to the procedures set forth in ASTM D1881, § 8, the foam volume and the break time were measured according to ASTM D1881. The maximum allowed to pass ASTM D1881 is a foam volume of 150 ml and a break time of 5 seconds.

TABLE 5

Anti-Foaming Properties (ASTM D1881)

| Example | Stock Coolant Used | Additive Used | Foam Volume (ml) | Foam Break Time (sec) |
|---|---|---|---|---|
| 15 | A | Water Pump Lubricant & Rust Inhibitor (Kleen-Flo ®) | >500 | 120 |
| 16 | A | STP Radiator Anti Rust plus Water Pump Lube (First Brands Corp.) | >500 | 150 |
| 17 | A | Prestone Cooling System Anti Rust plus Water Pump Lubricant (Prestone Products Corp.) | >500 | 130 |
| 18 | A | Radiator Antioxidant, Antirust and Lubricant (Bardahl Co.) | >500 | 50 |
| 19 | A | 1 | 50 | 5 |
| 20 | A | 5 | 45 | 4 |

As shown in Table 5, only Examples 19 and 20 passed both ASTM D1881 standards and Example 20 (comprising a rafted pH-adjusted polymer) had the best performance of all formulations tested.

3. ASTM D4340—"Standard Test Method for Corrosion of Cast Aluminum Alloys in Engine Coolants under Heat-Rejecting Conditions"

Six different antifreeze formulations were prepared and evaluated under the conditions set forth by ASTM D4340 See Annual Book of ASTM Standards, Section volume 15.05, (1996), incorporated herein by reference. ASTM D4340 is a standard method for general corrosion of aluminum surfaces under heat-rejecting conditions heat-transfer conditions present in aluminum cylinder heads).

As set forth in Table 6, except for Examples 21 and 24 which served as control formulations, each of these examples comprised a stock antifreeze coolant (Concentrate B or Formulation E shown it Tables 1B and 1E, respectively) and 0.5% (by weight) of a polymer additive (additive 1 or 5 shown in Tables 2–3). Before testing, each of the solutions was diluted with "aggressive water" (750 ml. of deionized water containing 165 mg. of reagent grade NaCl) to make a formulation with 25% (by volume) concentrate. These formulations were prepared in accordance with the "Treatment of Mixtures" prescribed by ASTM D1176.

After preparing the formulations and subjecting them to the test procedures set forth in ASTM D4340 (the aluminum specimen is exposed for 168 hours to the antifreeze formulation and maintained at a temperature of 135° C., pressure of 193 kPa), the corrosion rate was measured (average, of duplicate specimens). The maximum corrosion rate allowed by ASTM D4340 is 1.0 mg/cm²/week.

TABLE 6

Aluminum Hot Surface Test (ASTM D4340)

| Example | Stock Coolant Used | Additive Used | Corrosion Rate (mg/cm²/week) |
|---|---|---|---|
| 21 | B | None | 1.0 |
| 22 | B | 1 | 0.0 |
| 23 | B | 5 | 0.0 |

TABLE 6-continued

Aluminum Hot Surface Test (ASTM D4340)

| Example | Stock Coolant Used | Additive Used | Corrosion Rate (mg/cm²/week) |
|---|---|---|---|
| 24 | E | None | 9.9 |
| 25 | E | 1 | 3.8 |
| 26 | E | 5 | 1.8 |

As shown in Table 6, the addition of a grafted polymer (Examples 23 and 26) resulted in the lowest corrosion rate of all the formulations tested. While the addition of a non-grafted polymer to Coolant B (example 22) demonstrated the same corrosion rate (0.0) as that for the formulation with a grafted polymer (Example 23), because the corrosion rate of the corresponding control formulation (Example 21) was already relatively low, no conclusions can be made regarding the effectiveness of the non-grafted polymer compared to the grafted polymer. However, the significant improvement in corrosion rate (i.e., decreased rate) by the addition of a grafted polymer was demonstrated for Formulation E, i.e., the used formulation that was subjected to a fleet test of 100,000 miles (Examples 24–26). These results suggest that the grafted polymers provide improved protection against general aluminum corrosion for both silicate-based antifreeze formulations as well as organic acid based formulations.

4. ASTM D1384—"Standard Test Method for Corrosion Test for Engine Coolants in Glassware"

Ten different antifreeze formulations were prepared and evaluated under the conditions set forth by ASTM D1384. See Annual Book of ASTM Standards, Section 15, Volume 15.05 (1996), incorporated herein by reference. ASTM D1384 is a standard test method for general corrosion of a variety of metals typically found in the cooling and/or heating systems of internal combustion engines. In addition to the required metals to be tested under ASTM D1384, a high lead solder specimen was also tested.

As set forth in Table 7, except for Examples 27, 31 and 34 which served as control formulations, each of these examples comprised a stock antifreeze coolant (Concentrates B or C, or Formulation E shown in Tables 1B, 1C and 1E, respectively) and 0.5% (by weight) of a polymer additive (additive 1, 4 or 5 shown in Tables 2–3). Before testing, each of the solutions was diluted with "corrosive water" (deionized water containing 100 ppm each of deionized water containing 100 ppm each of $SO_4^{2-}$, $HCO_3^-$ and Cl⁻, all added as Na salts) to make a formulation with 33.3% (by volume) concentrate. These formulations were prepared in accordance with the "Treatment of Mixtures" prescribed by ASTM D1176.

After preparing the formulations and subjecting them to the test procedures set forth in ASTM D1384 (the metal specimens were immersed for 336 hours in the antifreeze formulation and maintained at a temperature of 88° C.), the weight change of the metal specimens were measured (average of triplicate specimens). A negative weight loss signifies a weight increase due to the formation of a protective coating on the metal surfaces.

TABLE 7

| | | | Metal Weight Loss (mg) (ASTM D1384) | | | | | | |
|---|---|---|---|---|---|---|---|---|---|
| Example | Stock Coolant Used | Additive Used | High Lead Solder | Copper | ASTM Solder | Brass | Steel | Cast Iron | Aluminum |
| ASTM Standard | | | — | 10 | 30 | 10 | 10 | 10 | 30 |
| 27 | B | None | 240 | 2.3 | 1.8 | 2.7 | 1.2 | −0.8 | −1.5 |
| 28 | B | 1 | 140 | −0.8 | −1.3 | −0.1 | −1.5 | −4.7 | −3.0 |
| 29 | B | 4 | −108 | −1.4 | 16 | −1.8 | −0.1 | −3.1 | −3.0 |
| 30 | B | 5 | −70 | −1.5 | −0.5 | −1.3 | −0.8 | −3.5 | −3.0 |
| 31 | C | None | 23.6 | 2.5 | 2.9 | 2.4 | 0.8 | 8.4 | 0.1 |
| 32 | C | 1 | 8.2 | 0.3 | 0.1 | 0.6 | 1.0 | −1.1 | −4.6 |
| 33 | C | 5 | 23 | −1.5 | −0.2 | −1.4 | −0.8 | −5.8 | −3.0 |
| 34 | E | None | 178.4 | 2.4 | 2.5 | 2.5 | 8.7 | 437.6 | 2.0 |
| 35 | E | 1 | −33.3 | −0.3 | —1.3 | −0.2 | 3.9 | 210.0 | −3.9 |
| 36 | E | 5 | −6.4 | −2.0 | −0.2 | −0.6 | −0.4 | 21.6 | −4.3 |

As Table 7 shows, the addition of a grafted polymer (Examples 29–30, 33, 36) to the control formulations (Example. 27, 31, 34) improved (by decreasing) the weight loss of the aluminum. Such result, confirm the ability of the grafted polymers to serve as general corrosion inhibiters for aluminum. In general, the results also show that such grafted polymers are also effective general corrosion inhibitors for other metals (see e.g., Example 27 vs. 28–29 and Example 34 vs. 35–36 for high lead solder, cast iron and steel).

What is claimed is:

1. A method for inhibiting the cavitation-erosion corrosion of aluminum surfaces comprising the step of contacting said surfaces with a formulation comprising a corrosion inhibitor composition, said corrosion inhibitor composition comprises (a) one or more carboxylic acids, or salts thereof, and (b) a polymerizable-acid graft polymer comprising from about 1.0% to about 60% by weight of an unsaturated grafting acid and an alkylene oxide polymer, said polymerizable-acid graft polymer having the following formula:

$$R''\text{—}[(OC_nH_{2n})_zOR']_a$$

wherein
each R' is independently selected from the group consisting of a hydrogen atom, hydrogen radicals and acyl radicals free of aliphatic unsaturation;
R" is selected from the group consisting of a hydrogen atom, hydrogen radicals, amine-containing radicals and acyl radicals, provided that all the R' and R" groups are not, at the same time, a hydrogen atom;
each "n" has, independently, a value of from 2 to 4;
each "z" has, independently, a value of from 4 to about 3500;
"a" has a value of from 1 to 4
and said formulation further comprising an alkali metal hydroxide in an amount sufficient to adjust the pH of the formulation to from 6.0 to 9.0.

2. A method for inhibiting the cavitation-erosion corrosion of aluminum surfaces comprising the step of contacting said surfaces with an antifreeze coolant formulation comprising:
(a) a liquid alcohol which function is as a freezing point depressant;
(b) from about 0.1% to about 5.5% by weight of a corrosion inhibitor composition comprising (i) one or more carboxylic acids, or salts thereof, and (ii) a polymerizable-acid graft polymer comprising from about 1.0% to about 60% by weight of an unsaturated grafting acid and an alkylene oxide polymer, said polymerizable-acid graft polymer having the following formula:

$$R''\text{—}[(OC_nH_{2n})_zOR']_a$$

wherein
each R' is independently selected from the group consisting of a hydrogen atom, hydrogen radicals, and acyl radicals free of aliphatic unsaturation;
R" is selected from the group consisting of a hydrogen atom, hydrogen radicals, amine-containing radicals and acyl radicals, provided that all the R' and R" groups are not, at the same time, a hydrogen atom;
each "n" has, independently, a value of from 2 to 4;
each "z" has, independently, a value of from 4 to about 3500;
"a" has a value of from 1 to 4;
(c) an alkali metal hydroxide in an amount sufficient to adjust the pH of the formulation to from 6.0 to 9.0, and
(d) from about 10% to about 9.0% by weight water.

3. The method of either claims 1 or 2, wherein the corrosion inhibitor composition comprises one or more carboxylic acids selected from the group consisting of saturated and unsaturated, aliphatic and aromatic mono-, di- and tri-carboxylic acids, and salts, and mixtures thereof.

4. The method of either claims 1 or 2, wherein the corrosion inhibitor composition comprises one or more carboxylic acids selected from the group consisting of $C_4$–$C_{12}$ mono-carboxylic and di-carboxylic acids, and salts, and mixtures thereof.

5. The method of either claims 1 or 2, wherein the corrosion inhibitor composition comprises one or more carboxylic acids selected from the group consisting of 2-ethyl hexanoic acid, neooctanoic acid, neodecanoic acid, sebacic acid, and alkali and salts, and mixtures thereof.

6. The method of either claims 1 or 2, wherein the corrosion inhibitor composition comprises a mixture comprising a major amount of a $C_8$ mono-carboxylic acid component, or salts, or isomers thereof, and neo-decanoic acid, or salts thereof.

7. The method of either claims 1 or 2, wherein the alkylene oxide polymer has the formula:

$$RO\text{—}[CH_2\overset{R'}{\underset{|}{C}}HO]_z\text{—}R$$

wherein

R is selected from the group consisting of a hydrogen atom, hydrogen radicals, amine-containing radicals, and acyl radicals;

each R' is independently selected from the group consisting of —H, —CH$_3$ and —C$_2$H$_5$, resulting, respectively, in an ethylene oxide ("EO"), propylene oxide ("PO") or butylene oxide ("BO") polymer; and "z" has a value of from 4 to about 3500.

8. The method of claim 7, wherein the alkylene oxide polymer is selected from the group consisting of EO and PO polymers, and copolymers of EO and PO polymers.

9. The method of claim 7, wherein the alkylene oxide polymer is a copolymer of EO and PO polymers having a weight ratio of from about 1:100 to about 100:1 of EO:PO.

10. The method of claim 7, wherein the alkylene oxide polymer is a copolymer of EO and PO polymers having a weight ratio of from about 1:20 to about 20:1 of EO:PO.

11. The method of claim 7, wherein the alkylene oxide polymer is a copolymer of EO and PO polymers having a weight ratio of from about 1:3 to about 3:1 of EO:PO.

12. The method of either claims 1 or 2, wherein the unsaturated grafting acid is selected from the group consisting of acrylic, methacrylic, crotonic, maleic, vinylsulfonic and vinylphosphoric acids.

13. The method of either claims 1 or 2, wherein the polymerizable-acid grafting polymer comprises from about 1.0% to about 30% of the grafting acid.

14. The method of either claims 1 or 2, wherein the polymerizable-acid graft polymer comprises from about 1.0% to about 20% of the grafting acid.

15. The method of either claims 1 or 2, wherein the formulation comprises from about 0.01% to about 20% by weight of the polymerizable-acid graft polymer.

16. The method of either claims 1 or 2, wherein the formulation comprises from about 0.1% to about 10% by weight of the polymerizable-acid graft polymer.

17. The method of either claims 1 or 2, wherein the polymerizable-acid grafting polymer comprises from about 3.0% to about 15% by weight of the grafting acid.

18. The method of claim 2, wherein the liquid alcohol is selected from the group consisting of methanol, ethanol, propanol, ethylene glycol, diethylene glycol, triethylene glycol, propylene glycol, dipropylene glycol, butylene glycol, glycerol, the monoethylether of glycerol, the dimethylether of glycerol, alkoxy alkanols, and mixtures thereof.

19. The method of claim 2, wherein the liquid alcohol is selected from the group consisting of ethylene glycol, diethylene glycol, propylene glycol, dipropylene glycol, and mixtures thereof.

20. The method of claim 2, wherein the antifreeze coolant formulation further comprises from about 0.01% to 0.4% by weight of one or more alkali or alkaline earth metal, ammonium and amine salts of nitrite.

21. The method of claim 2, wherein the antifreeze coolant formulation further comprises one or more additional corrosion inhibitors selected from the group consisting of di-carboxylic acids, triazoles, thiazoles, phosphates, borates, silicates, molybdates, nitrates and the alkali or alkaline earth metal, ammonium and amine salts thereof.

22. The method of claim 2, wherein the antifreeze coolant formulation further comprises benzotriazole, mercaptobenzothiazole or tolyltriazole.

23. The method of either claims 21 or 22, wherein the antifreeze coolant formulation comprises up to about 5.5% by weight of the additional corrosion inhibitors.

24. The method of claim 2, wherein the alkali mental hydroxide is present in an amount sufficient to adjust the pH of the formulation to from 6.5 to 9.0.

25. The method of claim 2, wherein the antifreeze coolant formulation further comprises one or more additives elected from the group consisting of dyes, odor masking agents, perfumes, antifoaming agents, lubricants, rust inhibitors, pH buffers, scale inhibitors, and sequestration and dispersion agents.

26. The method of claim 2, wherein the antifreeze coolant formulation comprises from about 25% to about 75% by weight water.

27. A method for inhibiting the cavitation-erosion corrosion of aluminum surfaces comprising the step of contacting said surfaces with an antifreeze coolant formulation comprising:

(a) from about 80% to about 99% by weight of a liquid alcohol which functions as a freezing point depressant;

(b) from about 2.0% to about 5.0 by weight of a mixture of 2-ethylhexanoic acid, or salts thereof, and neodecanoic acid, or salts thereof, (c) from about 0.01% to about 20 of a polymerizable-acid graft polymer comprising (i) acrylic acid and (ii) an alkylene oxide polymer comprising a copolymer of EO and PO polymers;

(d) from about 10% to about 90% by weight water; and said formulation further comprising an alkali metal hydroxide in an amount sufficient to adjust the pH of th formulation to from 6.0 to 9.0.

* * * * *